July 30, 1957 R. E. ROSENBERG 2,801,379
HIGH VOLTAGE APPARATUS FOR TELEVISION RECEIVERS
Filed Dec. 7, 1953
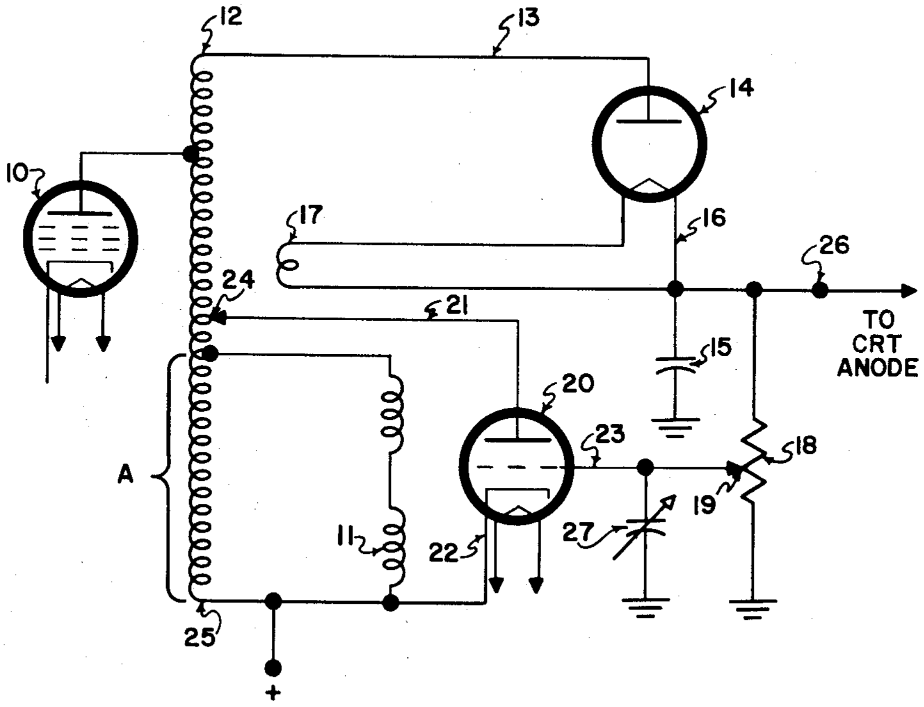
ROBERT E. ROSENBERG
INVENTOR.
BY Bruce L. Birchard
HIS ATTORNEY

1

2,801,379

HIGH VOLTAGE APPARATUS FOR TELEVISION RECEIVERS

Robert E. Rosenberg, Los Angeles, Calif., assignor to Hoffman Electronics Corporation, a corporation of California Application December 7, 1953, Serial No. 396,587

5 Claims. (Cl. 321—18)

This invention relates to improvements in the circuitry for apparatus utilizing cathode ray tubes for the display of information. More particularly, this invention relates to improved high voltage apparatus for television receivers.

In present day television apparatus a common and undesirable phenomenon occurs upon the adjustment of the brightness control in the receiver. The effect of such adjustment in the direction of increasing the brightness is, as a result of the poor regulation in the normal high voltage supply, to increase the brightness in less than the expected amount and to simultaneously reduce the width of the picture and destroy the focus of the image appearing on the screen of the television receiver. This effect is aggravating in black and white television but in the operation of color television apparatus it may completely destroy color fidelity and render the image reproduced on the screen of a television receiver totally unsatisfactory. This latter effect in color television receivers results from the particular characteristics of color television reproduction which require the registration or superposition of several images to produce the final multicolor image with any fidelity. Satisfactory means for preventing these phenomena have not yet been provided.

Therefore, it is an object of this invention to provide an improved high voltage system for television receivers or the like.

It is a further object of this invention to provide a high voltage system delivering at its output terminal a substantially continuous uni-directional potential.

It is a still further object of this invention to provide a regulated high voltage system delivering at its output terminals a substantially continuous uni-directional potential, this potential being independent of variations in load.

It is a yet further object of this invention to provide a simple and economical voltage regulator circuit for application to the high voltage supply of a television receiver or the like.

The features of the present invention which are believed to be novel are set forth with particularity in the appended claims. The present invention itself, both as to its organization and manner of operation, together with further objects and advantages thereof, may best be understood by reference to the following description, taken in connection with the accompanying drawing, in which the figure is a schematic diagram of a high voltage regulation circuit according to this invention.

In the figure, electron discharge device 10 is the conventional output amplifier tube of the horizontal sweep circuit and supplies power of the appropriate wave form to horizonal yoke 11 through transformer 12, which may be an auto-transformer or a two-winding transformer. A high alternating or fluctuating potential is applied to anode 13 of rectifier 14 from transformer 12 through the well-known fly-back action which results when output tube 10 is cut-off. As a result of the rectifying action of rectifier 14, a high, substantially continuous uni-

2 directional potential appears across condenser 15 which is connected between filament 16 and ground or reference potential. Heating potential for that filament is derived in conventional fashion by means of a small secondary winding 17 on transformer 12. Potentiometer 18 shunts condenser 15 and provides at its output terminal 19 a reduced uni-directional potential, the magnitude of which may be chosen in the fashion described hereinafter. Electron discharge device 20 is provided having anode 21, cathode 22 and control electrode 23. Anode 21 is connected to a first tap 24 on transformer 12. Cathode 22 is connected to a second tap 25 on transformer 12. The positions of taps 24 and 25 are selected so that during the re-trace or fly-back period there appears between anode 21 and cathode 22 a potential lying in the normal operating range of electron discharge device 20. The position of adjustable terminal 19 on potentiometer 18 is adjusted so that, with the desired uni-directional potential appearing at output terminal 26 when that terminal is connected to the anode of the cathode ray tube to be operated, electron discharge device 20 is on the border of conduction but is not, in fact, conducting. Variable capacitor 27 is connected between control electrode 23 of electron discharge device 20 and ground.

In practice, the circuit operates as follows. When the brightness control in the television receiver is adjusted for decreased brightness, there is a reduction in the beam current flowing to the cathode ray tube from terminal 26 of the high voltage supply. Consequently, there is a decrease in the loading of transformer coil 12. This causes an increase in the alternating potential appearing at the anode 13 of rectifier 14 and the potential appearing at output terminal 26 tends to increase. However, a portion of this increased potential is applied to the control electrode 23 of electron discharge device 20 through voltage divider 18. If the setting of adjustable terminal 19 is correct, this increase in potential will cause electron discharge device 20 to conduct. A resultant low impedance load will now appear across transformer 12, substantially short-circuiting a portion of the windings thereof and the alternating potential at the anode 13 of rectifier 14 will drop accordingly. By proper adjustment of the position of terminal 24 on transformer 12, the potential reducing action produced by conduction of electron discharge device 20 will exactly counteract the increase brought about by a reduction in the beam current of the cathode ray tube constituting the load for the power supply. The picture on the cathode ray tube will remain in focus and the width of the picture will not increase, all as a result of the regulating action produced by electron discharge device 20. Electron discharge device 20 may be considered a variable load device shunting a portion of transformer 12. Obviously, as the increment of uni-directional potential increases, the degree of conduction in electron discharge device 20 will increase, within limits of saturation, thus increasing the load on transformer 12 and producing a greater voltage stabilizing effect.

A certain ripple voltage will be present across potentiometer 18, this ripple voltage being a residuum after rectifying and filtering the high-voltage pulses produced in transformer coil 12 as a result of the well-known fly-back phenomenon. The amplitude of this ripple voltage will lessen as the cathode ray tube current increases, and, correspondingly, will become more pronounced as loading decreases. At first it might appear that capacitor 27 should be made large to filter out substantially all of this ripple voltage which otherwise is impressed upon control electrode 23. But it is found that a large capacitor will produce undesired low frequency feed-back, or "motor-boating." By making capacitor 27 somewhat smaller, this tendency to produce undesired low-frequency oscillations is overcome. Further, the magnitude of this capacitor 27 affects the amplitude of the ripple voltage applied to control electrode 23 of electron discharge device 20, and hence affects the degree to which electron discharge device 20 loads transformer 12 on positive ripple peaks. Thus, by properly adjusting capacitor 27, the voltage variations of short duration which tend to appear across potentiometer 18 as a result of ripple at the horizontal sweep frequency are kept at a constant minimum-value despite variations in the load on the voltage supply.

Electron discharge device 20 must be chosen so as to have sufficient plate dissipation to absorb, during the periods when the cathode ray tube is cut off, the power normally flowing into the anode of the cathode ray tube. This power may be in the order of five watts. Merely by way of example, the two halves of a 6SN7 may be connected in parallel to meet the requirements of this circuit when it is utilized in a conventional television receiver.

Although the foregoing discussion has dealt with the voltage regulator of this invention as applied to a "fly-back" type of high voltage system, it is apparent that it would be equally applicable to an R. F. type of high voltage power supply.

It is apparent from the foregoing description that there have been provided voltage regulator circuits for the high voltage systems associated with apparatus utilizing cathode ray tubes, such voltage regulator circuits being simple and effective in their operation. The problems of loss of focus and variations in raster width which normally accompany the adjustment of the brightness control in modern television receivers are totally eliminated by the use of either of the circuits described herein.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a source of high D. C. voltage with superimposed ripple voltage, a transformer, a rectifier coupled to said transformer, filter means coupled to said rectifier, and resistive load means coupled through said filter means to said rectifier for obtaining a high D. C. voltage with superimposed ripple voltage, variable load means coupled across a portion of said transformer, said load means including a load magnitude control element, means for applying a controllable portion of said D. C. voltage to said control element, and means coupled to said control element for regulating the magnitude of said superimposed ripple voltage applied to said control element to a substantially constant value despite variations in load upon said source.

2. In a source of high D. C. voltage with superimposed ripple voltage, a transformer, a rectifier coupled to said transformer, filter means coupled to said rectifier, and resistive load means coupled through said filter means to said rectifier for obtaining a high D. C. voltage with superimposed ripple voltage, automatically variable load means coupled across a portion of said transformer, said load means including a load magnitude control element, means for applying a controllable portion of said D. C. voltage to said control element, and means coupled to said control element for regulating the magnitude of said superimposed ripple voltage applied to said control element to a substantially constant value despite variations in load upon said source.

3. In a source of high D. C. voltage with superimposed ripple voltage, a transformer, a rectifier coupled to said transformer, filter means coupled to said rectifier, and resistive load means coupled through said filter means to said rectifier for obtaining a high D. C. voltage with superimposed ripple voltage, automatically variable load means coupled across a portion of said transformer, said load means including a load magnitude control element, means for applying a controllable portion of said D. C. voltage to said control element, and a variable capacitor coupled to said control element for regulating the magnitude of said superimposed ripple voltage applied to said control element to a substantially constant low level value despite variations in load upon said source.

4. In electronic apparatus, a high voltage supply including: a source of high fluctuating potential including a step-up transformer; a rectifier connected to said source for developing a high uni-directional potential with a superimposed ripple voltage; a voltage divider network coupled to the output of said rectifier and having an output terminal; an electron discharge device having at least anode, cathode, and control electrodes, said control electrode being coupled to said output terminal on said voltage divider network, said control electrode also being connected through a capacitor to ground, and said anode and cathode being coupled across a selected portion of said transformer.

5. In electronic apparatus, a high voltage supply including: a source of high fluctuating potential including a step-up transformer; a rectifier connected to said source for developing a high uni-directional potential with a superimposed ripple voltage; a voltage divider network coupled to the output of said rectifier and having an output terminal; an electron discharge device having at least anode, cathode, and control electrodes, said control electrode being coupled to said output terminal on said voltage divider network, said control electrode also being connected through a variable capacitor to ground, and said anode and cathode being coupled across a selected portion of said transformer.

References Cited in the file of this patent

UNITED STATES PATENTS

| | | |
|---|---|---|
| 2,664,540 | Beszedics | Dec. 29, 1953 |
| 2,665,393 | Bocciarelli | Jan. 5, 1954 |
| 2,700,747 | Finkelstein | Jan. 25, 1955 |